Feb. 11, 1941. W. B. HAUSMAN 2,231,470
CONTINUOUS PRINTER
Filed April 22, 1939 3 Sheets-Sheet 1

Inventor:
Ward B. Hausman,
By W. W. Williamson
Attorney.

Feb. 11, 1941.  W. B. HAUSMAN  2,231,470
CONTINUOUS PRINTER
Filed April 22, 1939   3 Sheets-Sheet 2
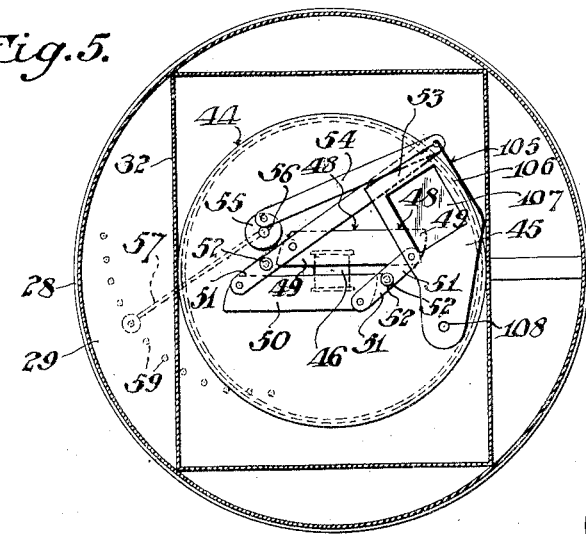
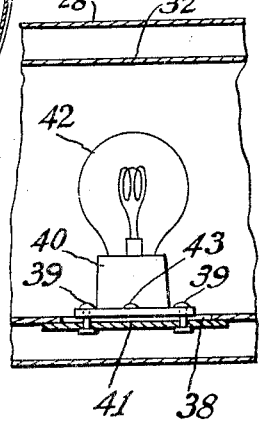
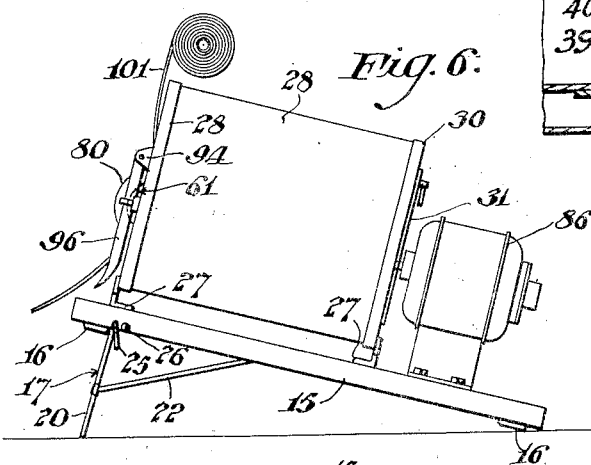
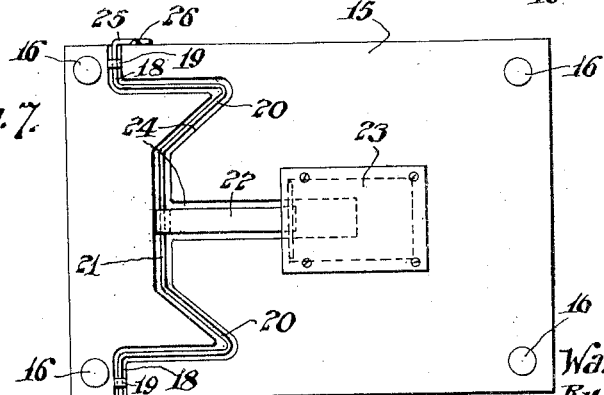
Inventor
Ward B. Hausman,
By W. W. Williamson
Attorney.

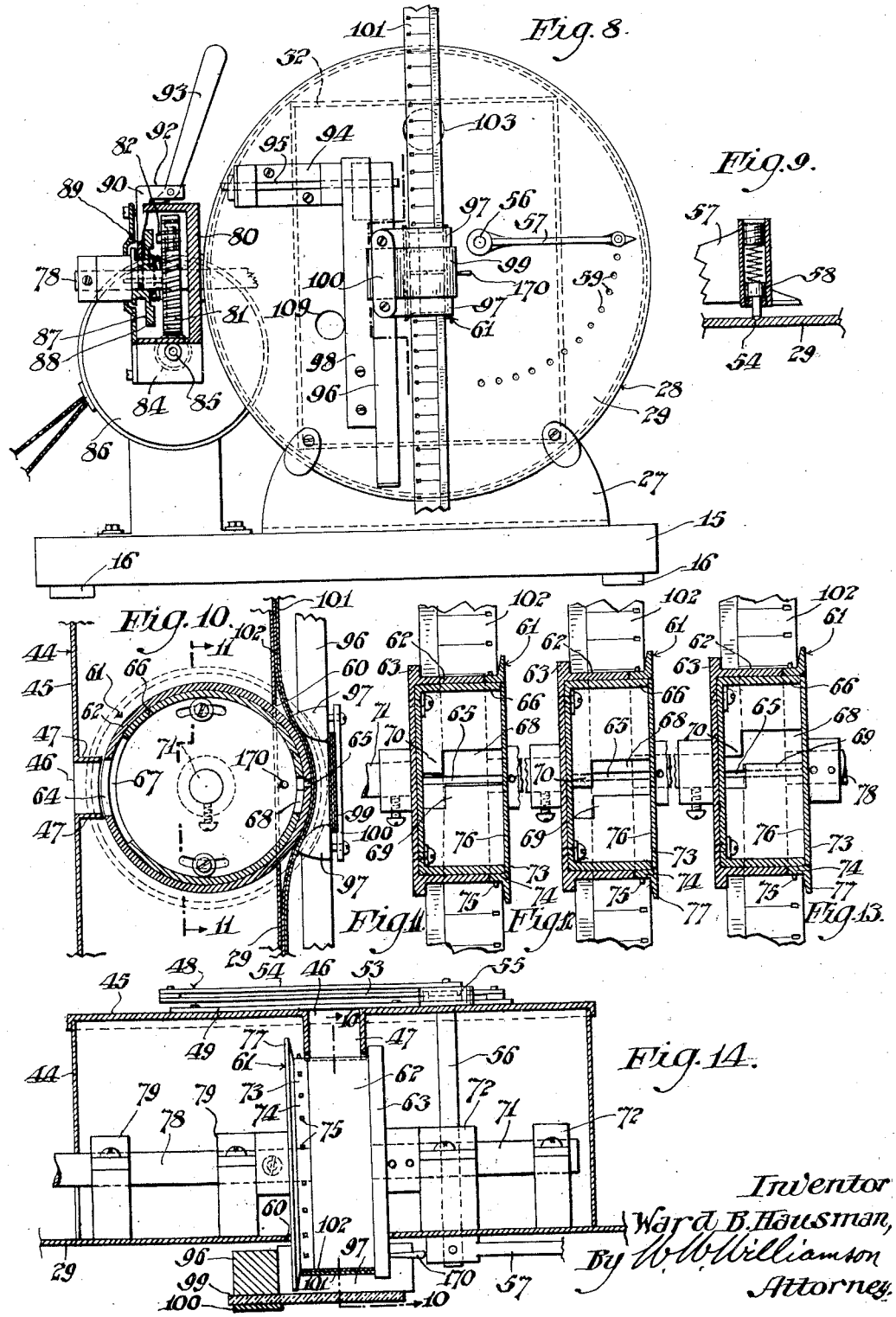

Patented Feb. 11, 1941

2,231,470

UNITED STATES PATENT OFFICE 2,231,470

CONTINUOUS PRINTER

Ward B. Hausman, Philadelphia, Pa.

Application April 22, 1939, Serial No. 269,347

7 Claims. (Cl. 95—75)

My invention relates to a new and useful continuous printer for motion picture films and has for one of its objects to provide a compact, relatively inexpensive, portable and efficient machine of this character that will print a positive film directly from a negative film in one continuous operation at an even speed.

Another object of the invention is to provide an adjustable lamp socket so that the position of the source of light for exposing the positive film may be regulated relative to the point of exposure.

Another object of this invention is to provide an adjustable shutter within the lamp housing that may be easily and readily operated from the front of the machine and the adjustments determined by the position of an operating handle.

Another object of the present invention is to provide a combined film exposure regulator and carrier as a unitary structure which will properly propel the films across an exposure slot and a portion of which structure may be adjusted to permit the exposure of the entire width or predetermined portions of the films.

A further object of the invention is to provide a simple and effective means for positively transmitting motion from the driving mechanism to the driven mechanism.

A still further object of the invention is to construct a continuous printer of the kind herein mentioned which may be used by persons not highly skilled in this line as well as by the professional and all of the advantages will accrue to both types of operators.

With the above and other objects in view this invention consists of the details of construction and combination of elements hereinafter set forth and then designated by the claims.

In order that those skilled in the art to which this invention appertains may understand how to make and use the same I will describe one construction in detail, referring by numerals to the accompanying drawings, in which:

Fig. 5 is a section of the shell and housing on the line 5—5 of Fig. 1.

Fig. 6 is a side elevation of the entire assembly on a reduced scale and showing the apparatus elevated at the forward end.

Fig. 7 is a bottom plan view thereof with the support folded or retracted.

Fig. 8 is a front elevation of Fig. 1 with the gear box and a portion of the clutch in section.

Fig. 9 is a sectional elevation of the shutter operating lever.

Fig. 10 is an enlarged sectional view of the combined film actuating means and selector taken on the line 10—10 of Fig. 14.

Fig. 11 is a section on the line 11—11 of Fig. 10.

Figs. 12 and 13 are similar views showing the selector in other positions.

Fig. 14 is a fragmentary sectional elevation on the line 14—14 of Fig. 1.

Fig. 15 is a fragmentary longitudinal sectional view through the shell, lamp housing and slide, with the lamp socket and lamp in elevation.

Figure 1:
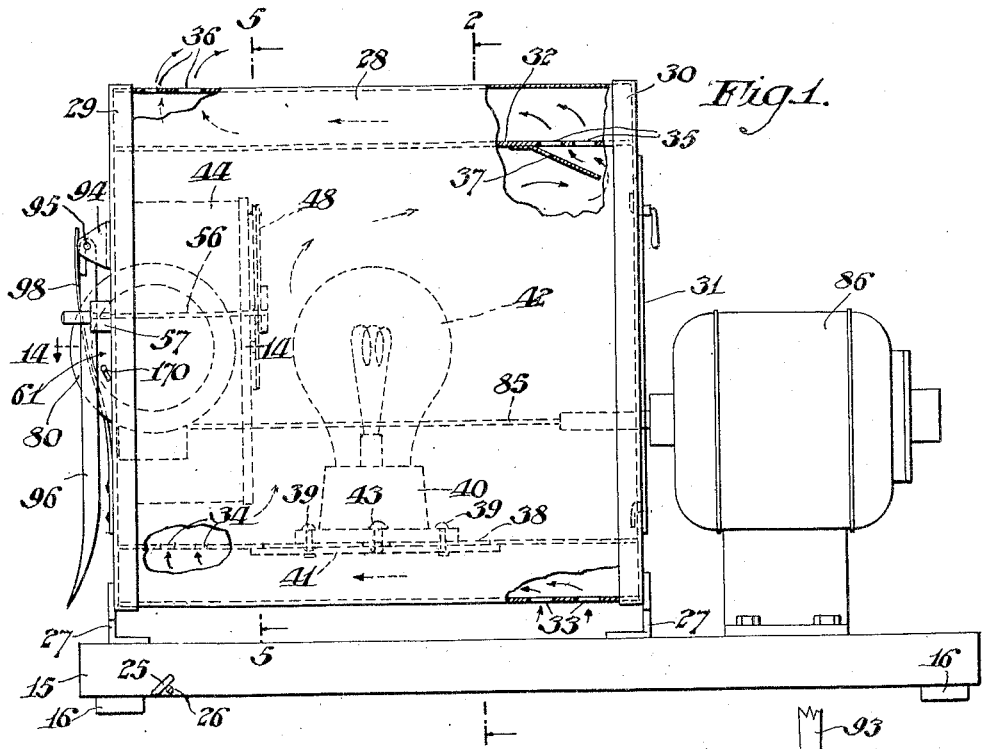
Fig. 1 is a side elevation of a continuous printer constructed in accordance with my invention, a portion of the shell and housing being broken away to illustrate a structural detail.
Figure 2:
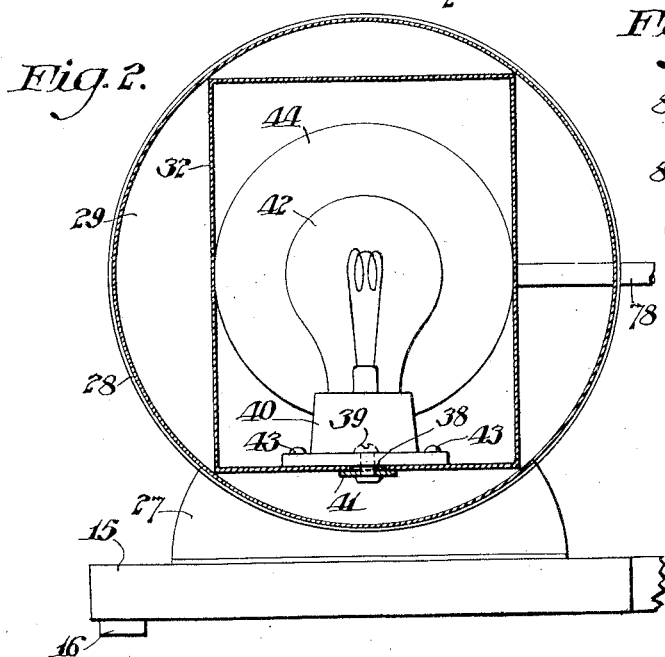
Fig. 2 is a section on the line 2—2 of Fig. 1, some of the parts being left out for purposes of clearness.

In carrying out the invention as herein embodied 15 represents a support for the entire assembly and preferably consists of a panel of any suitable material constituting a base which may have feet 16. In order to raise the front end of the apparatus and retain the desired inclination to give a clearer view to the front of the machine I provide a substantially W-shaped adjustable brace 17 fashioned from wire and comprising end journals 18 mounted in bearings 19, legs 20 and a center journal 21. To the center journal is connected one end of a slide 22, the opposite end of which is slidably mounted inside of a plate 23 secured to the bottom of the base 15. Said base may be grooved as at 24 to receive the several parts of the brace, especially when the latter is folded up or retracted. One end of the brace is provided with an angular extension 25 which may project from one of the bearings 18 and over the edge of the base. This stop may be the head of the round head screw. The extension 25 rides over and drops back of the stop when the brace is retracted and prevents said brace from being accidentally opened.

Suitably mounted on top of the base 15, as by brackets 27, is a shell 28 including, preferably, a cylindrical body having front and rear end walls 29 and 30 respectively, said end walls being similar to caps. In the rear end wall in an access opening normally closed by a removable cover 31.

Within the shell 28 is a housing 32, preferably rectangular in cross section so as to leave air spaces between the side walls of the shell and said housing. The housing 32 extends from one end wall to the other of the shell and said housing is so positioned that its side walls are vertical and its top and bottom walls are horizontal.

The shell 28 has ventilator openings 33 in the bottom at one end, for instance the rear end, and similar openings 34 are formed in the bottom of the housing in staggered relation to the openings 33 and therefore said openings are adjacent the front end of the apparatus. Other openings 35 are provided in the top wall of the housing and they are located adjacent the rear end so as to be staggered relative to the openings 34 and additional openings 36 are provided in the top of the shell and the latter are located adjacent the front of the printer so that they will be in staggered relation to the openings 35. A light shield 37 is associated with the openings 35 to prevent rays of light being reflected through openings 35 and 36. This light shield may be the material partially punched from the openings 35 and turned inwardly. Due to the location of the openings 36 at the rear of the apparatus no light shield is needed at the bottom.

In the bottom wall of the housing 32 is a longitudinal slot 38 through which pass fastening devices 39 to attach the lamp socket 40, resting on said bottom wall within said housing, to a slide 41 on the opposite side of said bottom wall of the housing. Said fastening devices are spaced apart a less distance than the length of the slot 38 to permit the lamp socket assembly to slide lengthwise of said slot. This arrangement permits the socket 40 to be slid to and fro for adjustment relative to the point of printing as will be later described. The slide 41 should be of such dimensions as to cover the slot 38 in all positions of the socket 40. Said socket is adapted to hold an electric lamp 42 and has terminals 43 to which the wires for supplying current are attached.

Mounted on the inner surface of the front wall 29, so as to be within the lamp housing, is a casing 44 having a rear end wall 45 with a light opening 46 therein and the interior of said casing is shielded from the light by light shields 47 one of which is at both the top and bottom of the opening 46 and sometimes at the sides.

The amount of light passing through the light opening 46 is controlled by a shutter 48, Figs. 5 and 14, comprising two horizontal plates 49 and 50 movable towards and away from each other in parallel relation. To accomplish this the ends of said plates are pivoted to links 51 which in turn are pivoted, as at 52, midway between the pivots of the plates 49 and 50, to the rear end wall 45 of the casing. One of the links is extended to provide a lever 53 and to the outer free end of this lever is pivoted one end of a connecting rod 54 while the opposite end of said connecting rod is pivoted to an arm 55, herein shown as a disc, of a crank. In addition to the arm 55, the crank includes an axle 56 projecting through the walls 29 and 45 and on the inner end of which is mounted the arm 55 while on the outer end of said axle is mounted an operating handle 57. Whenever the handle 57 is moved to rotate the axle the shutter plates will be actuated to open or close the light opening 46 any desired degree.

In order to properly set the shutter and retain it in any desired adjustment without the likelihood of it being accidentally moved, a spring catch 58 is mounted in the handle 57 for projection into the indentations 59 in the outer surface of the end wall 29 and in the path of travel of said catch.

In the front wall 29, directly opposite the light opening 46, is a hole 60 through which projects a portion of the combined film exposure regulator and carrier 61, Fig. 10. Said regulator and carrier includes a drum or cylinder 62 closed at one end and provided with a flange 63. In the circular body of the drum is a light entrance opening 64 approximately the same size as the opening 46 and diametrically opposite said opening 64 is a light egress opening or exposure slot 65 also in the circular body of the drum. A light valve or regulating member 66 is rotatably mounted in the drum for limited movements relative to said drum. The circular body of this valve snugly fits the body of the drum and has a large opening 67 in the region of the opening 64 so that the latter cannot be obstructed regardless of the position of the valve. Also in the circular body of the valve opposite the opening 67 is an irregular shaped opening 68 providing a lip 69 which can be used to cover a major portion of the slot 65 and a tongue 70 which can be used to cover a minor portion of the slot 65 while between the ends of the lip and tongue the opening is the full width of the valve body so that the slot 65 can be completely uncovered or exposed when said lip and tongue are positioned on opposite sides of the slot. In order that the full width of the irregular shaped opening 68 may coincide with the length of the slot when desired, the closed end of the light valve or regulating member 66 is set into or countersunk in the end wall of the drum or cylinder 62, as plainly illustrated in Figs. 11, 12 and 13. This positions the inner face of the end wall of the light valve in a vertical plane at one end of the slot 65 or in the same plane as the inner face of the flange 63 with which one edge of all films may coact. The valve is selectively rotated by a handle 170 or equivalent. This handle may be a stud carried by the valve and projecting through a slot in the end wall of the drum with a nut thereon to retain the adjustment as is well known.

The drum 62, with the valve therein, is mounted in a stationary position on the end of a rod 71 fixed in clamps 72 which are made like bearings for the purpose of simulating real bearings to be presently described.

A sprocket wheel 73 coacts with the drum to complete the enclosure for the light valve 66 and said sprocket wheel comprises a narrow circular body 74 having the same interior and exterior diameters as the body of the drum, sprockets or teeth 75 on the outer circumference of the body, an end wall or web 76 and a flange 77. The sprocket wheel 73 is fixed to the inner end of a revolving shaft 78 journalled in suitable bearings 79 supported by the front end wall 29 of the shell, the same as the clamps 72.

It is to be particularly noted that neither the rod 71 nor said shaft 78 extends into or across the interior of the combined film exposure regulator and carrier and therefore the light rays will not be interrupted. Said shaft does project through the casing 44, housing 32 and shell 28 so that a driving mechanism may be connected with the outer end thereof.

Figure 3:
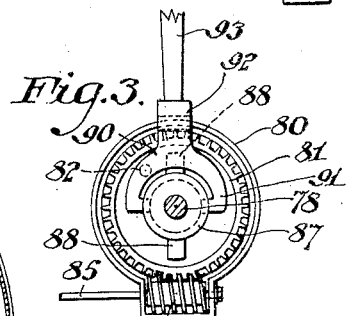
Fig. 3 is a view of a portion of the drive mechanism and clutch.
Figure 4:
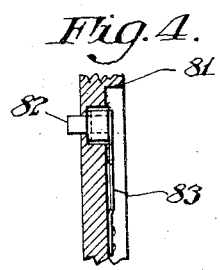
Fig. 4 is an enlarged sectional view of the gear forming a part of the clutch.

Said outer end of the shaft 78 projects into a gear box 80, Figs. 3 and 8, and has a gear 81 revolvably mounted thereon. This gear carries a pin 82 extending all the way through and slidably mounted in the gear web and the inner end of said pin is normally urged beyond the inner face of the gear by a spring 83, Fig. 4, which may be of the flat type having the end thereof opposite the pin fixed to the gear.

The gear 81 meshes with a worm 84 within the gear box and fixed to a driving shaft 85 to which is connected a prime mover 86, such as an electric motor, mounted on the support or base 15.

Splined on the shaft 78 contiguous the gear 81 is clutch member 87 having arms 88 and normally urged away from the gear 81 by a spring 89, Fig. 8. A shifting lever 90 is fashioned so that it is mounted on an edge of the gear box, formed by a slot, for rocking movement and includes a yoke 91 engaged in a peripheral groove of the clutch member 87 and an arm 92 overlying the outside of the gear box. In said arm 92 is pivoted a cam lever 93 for coaction with a surface of the gear box. As shown in Fig. 8, when the cam lever is positioned to disengage its inner end from the gear box surface the spring 89 will retract the clutch member 87 and the driven mechanism will stop or remain stationary. By moving the cam lever 93 to the opposite position the inner end thereof will engage the gear box surface and raise the outer end of the shifting lever arm 92 and move the yoke 91 and the clutch member 87 towards the gear 81 so that one of the arms 88 of said clutch member will engage the pin 82 on the gear 81 to cause said gear to revolve with the clutch member and thereby transmit motion to the driven mechanism. If at the time the clutch member is moved for connecting the driving and driven mechanism, an arm 88 should be in alignment with the pin 82 so as to engage the end of the latter, said pin will be forced out of the way against the action of its spring 83 until the contacting arm 88 can pass over the pin. At this time the pin will be returned to its normal position in the path of travel of an arm 88.

On the outer surface of the front end plate 29 is a bracket 94 having a pintle 95 journalled therein and on said pintle is fixed a lever 96 carrying a pair of spaced horizontal presser arms 97 to hold or guide films in close proximity to the bodies 62 and 74 of the drum and sprocket wheel respectively, in the region of the slot 65 of the film exposure regulator and carrier. For this purpose, one presser arm is above and the other below said slot 65. The lever 96 and component parts are resiliently pressed towards the film exposure regulator and carrier by a spring 98.

A sheet of red glass 99 or equivalent may be mounted on the film presser device across the space between the presser arms by a clamp 100. This sheet of glass will prevent any chance of a film being fogged by the white light after passing through the films at the area being printed. This glass is not absolutely essential unless the light used is very strong or intense, or unless the printing operations are delayed while the light in the printer is left lit.

The printer is used particularly for printing a positive film 101 directly from a negative film 102 and is especially advantageous for printing those including both images and a sound track. The films are supported in any suitable manner, as on reels (not shown), and pass over the film exposure regulator and carrier 61 between the flanges 63 and 77 to retain them in proper positions during the actual printing process from which place they run onto suitable holders, such as reels or spools, and since these are well known they are not illustrated. At some suitable location above or ahead of the film exposure regulator and carrier so as to be traversed by the films is a hole 103 in the end wall 29, Fig. 8, covered by red glass or an equivalent, through which the interior light rays pass to permit the operator to ascertain the density of succeeding areas of the negative film prior to reaching the point of exposure.

To eliminate the necessity of extinguishing the printing light and to insure that the white light rays will not reach the films while they are being placed in the printer or adjusted I provide a shielding means 105 for disposition into and out of the path of the rays from the light source to the opening 46. This shielding means comprises a frame 106 with a sheet of red glass 107 or its equivalent mounted therein. The frame 106 is fixed to a rotatable rod 108 passing through the end wall 45 of the casing 44 and the front wall 29 of the shell, and on the forward end of said rod is a knob 109 or other operating means whereby the rod may be rotated. By turning the rod 108 through the medium of the knob 109 the frame may be raised during printing and lowered when the films are being installed or adjusted to prevent fogging.

Prior to starting the printing operations, the negative film is examined to ascertain its general density and then the lamp or bulb 42 is placed in a desired location by sliding the socket 40 towards or away from the casing 44. Next the positive and negative films are placed over that portion of the combined film exposure regulator and carrier that projects outside of the casing 44 through the hole in the front end wall 29. The apertures adjacent an edge of the films are registered with the teeth on the sprocket wheel 73 and the lever 96 pulled down so the presser arms 97 will hold the films together and adjacent the film exposure regulator and carrier.

The lamp can now be lit and the motor started. If the operator is not sure as to what amount of light would give the best results, a number of test prints can first be made of short lengths of the film. For this purpose the light valve can be turned until the full width portion of the opening 68, between the lip and tongue, is directly opposite or in alignment with the slot 65 and the handle 57 set at some preferable one of its extreme positions to regulate the shutter 48, and the cam lever 93 actuated to throw in the clutch for coupling the driving mechanism to the driven mechanism. Upon completion of several exposures the driven mechanism is stopped and the handle 57 moved, say two points, to change the opening of the shutter 48 and several more exposures made as before. These operations are continued until any desired number of exposures are provided. The exposed part of the film is then developed and examined to determine which setting of the shutter 48 is best for the particular negative. Should the operator decide that one of the settings is proper it can be determined by the numerical sequence of the exposures which one to use. If on examination it is discovered that one of any two contiguous exposed sections is too light and the other too dark then the shutter 48 can be set accordingly. This is done by placing the handle 57 in cooperative relation to an indentation 59 between the two indentations used for positioning said handle in making the exposures selected as most closely approaching the desired density.

When the proper setting of the shutter 48 has been finally determined the cam lever 93 is again positioned for connecting the driving mechanism to the driven mechanism and the sprocket wheel 73 will carry the two films at an even speed over the circular body of the drum 62 across the slot 65 thereby making a continuous exposure. By watching the films as they pass the opening 103 any change in the density of the negative can be ascertained and the setting of the shutter 48 varied immediately by changing the position of the handle 57.

If, during examination of the test sections of the positive, it is discovered that the best exposure for the image portion of the film is also the sound track, the light valve 66 can be adjusted so that the widest portion of its opening 68 is in registration with the slot 65 for the exposure of the film. Should it be found, instead, that different setting of the shutter 48 are better for the exposures of the image and sound track portions of the film then each may be exposed separately. This is accomplished by rotating the light valve 66 until, for example, the tongue 70 is disposed across the slot 65 and the films run for exposing only the image portion of said films with one setting of the shutter 48. After this has been done the films are again run through the printer with the light valve set so that the lip 69 is disposed across the slot 65 and the sound track exposed under a different setting of the shutter 48.

From the foregoing it will be obvious that a continuous printer is provided in which the condition of the negative may be observed at all times and such adjustments as are necessary to take care of the varying densities easily and quickly made. One highly important feature of the invention is the provision of the light valve that permits the exposure of the image and sound track portions separately, or the entire width of the films at one time.

Of course I do not wish to be limited to the exact details of construction herein shown and described as these may be varied within the scope of the appended claims without departing from the spirit of my invention.

Having thus described my invention, what I claim as new and useful is:

1. A film printer comprising a lamp housing, a source of light in said housing, means to permit shifting of the position of said light source, a film exposure regulator and carrier in line with said light source and including an apertured drum over a portion of which superimposed films travel, and an adjustable light valve within the drum to expose preselected portions of the films and a sprocket wheel to advance the films, means to support the drum in a stationary position, a shaft on which the sprocket wheel is mounted, a driving shaft, means to transmit motion to the first mentioned shaft from said driving shaft, a shutter interposed between the light source and the film exposure regulator and carrier, and means having a portion disposed at the front of the printer to adjust the shutter to predetermined settings.

2. A film printer comprising a shell, a housing within said shell, the walls of said shell and housing being spaced apart, a casing mounted on an end wall of the shell within the housing, said casing having an opening of the shell on which the casing is mounted, a combined film exposure regulator and carrier located generally within the casing and having a portion protruding through the second named opening, said film exposure regulator and carrier including a drum with oppositely disposed light ingress and egress openings in alignment with the casing openings and a sprocket wheel and a light valve rotatably mounted within the light tight chamber formed by the drum and sprocket wheel, said light valve having an opening aligning with and adjacent the light ingress opening and another irregular shaped opening in alignment with and adjacent the light egress opening, a lip formed by the irregular shaped opening to selectively cover the minor portion of said light egress opening, said lip and tongue extending in opposite directions with a space between their adjacent ends equal in length to the entire width of the irregular shaped opening whereby the light egress opening may be selectively uncovered, means to support the drum in a stationary position, and means to revolve the sprocket wheel.

3. The structure in claim 2, in combination with a shutter on the inner end wall of the casing to control the light passing through the opening in said wall, and means having a portion at the front of the printer for manually adjusting the shutter.

4. In a device of the kind described, a housing containing a source of light and having an opening in its front wall, a combined film exposure regulator and carrier located within the housing and having a portion projecting through the front wall opening, said regulator and carrier comprising a drum closed at one end with a countersink in the inner surface of said closed end and the circular body having oppositely disposed light ingress and egress openings, a light valve closed at one end and rotatably disposed within the drum so the closed end of said valve is positioned in the countersink of the drum and the circular body of the light valve having a large opening for registration with the light ingress opening of the drum and further provided with a directly opposite irregular shaped opening, a lip provided by said irregular shaped opening to selectively cover the major length of the light egress opening, a tongue also provided by side irregular shaped opening to selectively cover the minor length of the light egress opening, said lip and tongue being at opposite sides of the light valve and the adjacent end of each terminating short of a line projected from the end of the other to selectively uncover the entire length of the light egress opening, means to rotate said light valve, a sprocket wheel coacting with the drum and closing the open ends of both said drum and the light valve, and means to revolve the sprocket wheel.

5. The structure in claim 4 in combination with a spring pressed lever, a pair of vertically spaced presser arms on said lever to engage films and urge them towards the drum and sprocket wheel, a sheet of colored semi-transparent material positioned between said presser arms, and means to hold said sheet in place.

6. The structure in claim 4 wherein the housing has a hole above the opening through which a portion of the film exposure regulator and carrier projects, and a sheet of colored semi-transparent material covering said hole whereby the films may be examined prior to being exposed.

7. In a device of the kind described, a combined film exposure regulator and carrier comprising a stationary drum including a circular body, one end wall and an exterior flange projecting from the body at the walled end, said flange adapted to guide the contiguous edges at one side of superposed films, the inner face of the end wall being countersunk, said circular body having oppositely disposed light ingress and egress openings, a light valve rotatably mounted in the drum and including a circular body and one end wall, the walled end setting in the countersink of the drum whereby the inner surface of the valve end wall is in line with the inside of the drum flange, the circular body of the light valve having oppositely disposed openings, one of which is of irregular shape to expose the entire width of the films and provides means for selectively covering the picture and sound track portions of the films, a revolvable sprocket wheel having a solid web to close the open ends of the drum and light valve, and a flange on said wheel to guide the contiguous edges at the other side of the films.

WARD B. HAUSMAN.